US008640193B2

(12) United States Patent
Shigeeda

(10) Patent No.: US 8,640,193 B2
(45) Date of Patent: Jan. 28, 2014

(54) IMAGE PROCESSING APPARATUS, METHOD FOR CONTROLLING THE SAME, PROGRAM, AND STORAGE MEDIUM

(75) Inventor: Nobuyuki Shigeeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1475 days.

(21) Appl. No.: 11/313,775

(22) Filed: Dec. 20, 2005

(65) Prior Publication Data

US 2006/0136992 A1    Jun. 22, 2006

(30) Foreign Application Priority Data

Dec. 22, 2004  (JP) ................................. 2004-371063
Oct. 31, 2005  (JP) ................................. 2005-316715

(51) Int. Cl.
*G06F 7/04*     (2006.01)
*G06F 17/30*    (2006.01)
*G06F 15/16*    (2006.01)
*G06F 1/26*     (2006.01)
*G06F 11/00*    (2006.01)

(52) U.S. Cl.
USPC ................ 726/2; 726/3; 726/4; 726/5; 726/6; 726/7; 726/8; 726/9; 726/10; 726/32; 726/34; 713/176; 358/1.13

(58) Field of Classification Search
USPC ............ 726/2–10, 32, 34; 358/1.13; 713/176
See application file for complete search history.

(56) References Cited

U.S. PATENT DOCUMENTS

| | | | |
|---|---|---|---|
| 6,301,611 B1 | 10/2001 | Matsumoto et al. | |
| 6,587,880 B1 | 7/2003 | Saigo et al. | |
| 6,762,857 B1 | 7/2004 | Salgado et al. | |
| 7,243,366 B2 * | 7/2007 | Medvinsky et al. | 726/2 |
| 7,475,336 B2 * | 1/2009 | Fujiwara | 715/230 |
| 7,895,256 B2 * | 2/2011 | Zombek et al. | 709/200 |
| 2002/0054365 A1 | 5/2002 | Eguchi | |
| 2003/0030657 A1 * | 2/2003 | Kenji | 345/700 |
| 2003/0090705 A1 * | 5/2003 | Ferlitsch | 358/1.15 |
| 2004/0015713 A1 * | 1/2004 | Abe et al. | 713/200 |
| 2004/0021890 A1 | 2/2004 | Hirai et al. | |
| 2004/0080771 A1 * | 4/2004 | Mihira et al. | 358/1.13 |
| 2004/0174557 A1 * | 9/2004 | Sasama | 358/1.15 |
| 2004/0187036 A1 | 9/2004 | Nakamura | |
| 2005/0073709 A1 * | 4/2005 | Kujirai et al. | 358/1.14 |
| 2005/0275866 A1 * | 12/2005 | Corlett | 358/1.14 |

FOREIGN PATENT DOCUMENTS

| | | |
|---|---|---|
| JP | 09-274605 A | 10/1997 |
| JP | 11-212912 A | 8/1999 |
| JP | 2001-228749 A | 8/2001 |
| JP | 2002-041385 A | 2/2002 |
| JP | 2003-067336 A | 3/2003 |
| JP | 2003-298793 A | 10/2003 |
| JP | 2004-005409 A | 1/2004 |
| JP | 2004-213067 A | 7/2004 |

* cited by examiner

*Primary Examiner* — Edan Orgad
*Assistant Examiner* — Kari Schmidt
(74) *Attorney, Agent, or Firm* — Canon USA, Inc. IP Division

(57) ABSTRACT

An image processing apparatus for providing at least a service to a service requester receives a service execution request and authentication information of a service requester from the service requester and issues a request for authenticating the service requester to an authentication service. Also, the image processing apparatus executes the requested service based on an authentication result transmitted from the authentication service. Further, the image processing apparatus manages an execution state of the executed service and an authentication state of the service requestor by associating the execution state with the authentication state.

10 Claims, 15 Drawing Sheets

FIG. 11

| | | | | | | | |
|---|---|---|---|---|---|---|---|
| User ID | Available service | | | | Forced two-sided | Forced 2 in 1 | Forced 4 in 1 | Customization setting |
| | Copy | Send | Mail Box | Scan | Color output | | | | |
| 690MB | OK | OK | OK | NG | NG | ✓ | – | – | NA |
| JMTN3 | OK | OK | OK | OK | OK | – | – | – | Initial screen : Send |
| DP601 | OK | NG | NG | NG | NG | ✓ | – | ✓ | NA |
| ... | | | | | | | | | ... |

```
<?xml version="1.0"?>.
<xmlscript name="Sample1">
    <mapping>
        <Service>http://abc.org/mfp/PrintService</Service>        ⎫
        <AuthService>http://abc.org/mfp/AuthenticationA</AuthService>  ⎬ 1201
    </mapping>                                                    ⎭
    <mapping>                                                     ⎫
        <Service>http://abc.org/mfp/ScanService</Service>         ⎬ 1202
        <AuthService>http://abc.org/mfp/AuthenticationB</AuthService>  ⎭
    </mapping>
    <mapping>                                                     ⎫
        <Service>http://abc.org/mfp/StorageService</Service>      ⎬ 1203
        <AuthService>http://abc.org/mfp/AuthorizationB</AuthService>   ⎭
    </mapping>
    <mapping>                                                     ⎫
        <Service>http://abc.org/mfp/FaxService</Service>          ⎬ 1204
        <AuthService>http://zzz.org/server/AuthenticationC</AuthService>  ⎭
    </mapping>
</xmlscript>
```

| Job ID information | User ID | Information about Service processing flow | | |
|---|---|---|---|---|
| | | Single/Multiple | Service configuration | Service in execution |
| 0001 | 690MB | Multiple | copy;scan,print | scan |
| 0002 | DP601 | Single | print; | |
| ⋮ | ⋮ | ⋮ | ⋮ | ⋮ |

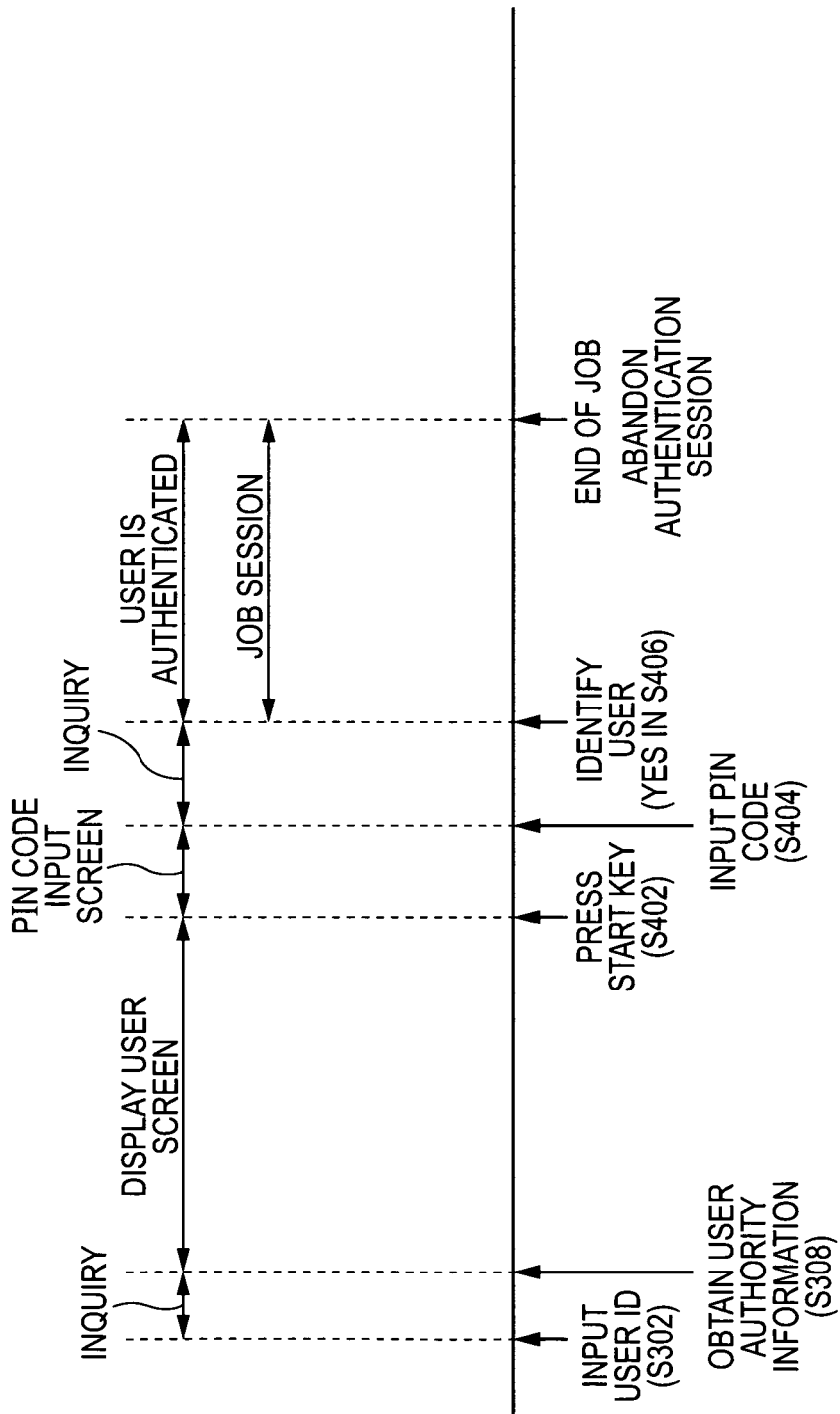

IMAGE PROCESSING APPARATUS, METHOD FOR CONTROLLING THE SAME, PROGRAM, AND STORAGE MEDIUM

BACKGROUND OF THE INVENTION

1. Field of the Invention

The present invention relates to an image processing apparatus, a method for controlling the image processing apparatus, a program, and a storage medium. More specifically, the present invention relates to user authentication performed in an image processing apparatus providing at least one service.

2. Description of the Related Art

In recent years, various operations and high-value-added expanded functions as well as a conventional standalone function have been realized by computers (personal computers (PCs)), peripheral devices, and multifunction printers (MFPs) connected through a network. In this environment, network printing, transmission of scan images through a network, and account management in copying or printing are managed in centralized management by a master PC through a network. Further, by appropriately authenticating/identifying each user and authorizing the user to use an apparatus based on user authority under centralized management, the MFP or the like can be protected against unauthorized users.

By connecting an MFP and PC to a network, the function of the MFP, that has conventionally functioned on a standalone basis and whose ability has been limited, can be enhanced. On the other hand, in such a situation that the MFP is remotely available through a network from a physically remote place, problems of leakage of information or unauthorized use of the MFP tend to increase. Accordingly, a user authentication function or an access control function has been provided in MFPs in order to overcome these problems.

Typically, the MFP has been provided with a simple security function since the MFP was used on a standalone basis. However, due to the above-described background, MFPs having a safer and reinforced security function have been developed. At the same time, this reinforced high-security function itself has been regarded as added value of MFPs, and has been separately sold as an optional product which is to be installed into the MFP.

In an MFP having a reinforced security function, a user login function or an access control function can be used to prevent leakage of confidential information. When an MFP having such a reinforced security function is used, a login screen is displayed on a display of an operation panel. Before using the MFP, a user has to input a user ID and a password to pass user authentication in order to access the operation screen of the MFP.

Once the user passed the user authentication, an operation screen is displayed on the operation panel of the MFP, so that the user can use functions of copy, FAX, scan, and transmission of an electronic file. After the user ends the operation of the MFP, the user explicitly presses a logout button to perform logout. Under a login state, the user can freely specify any operation. Even if the user goes away from the MFP without explicitly pressing a logout button, a function installed in the MFP automatically performs logout after a predetermined timeout period, so that masquerade of a user can be reduced.

However, if another user operates the MFP before the automatic logout processing starts by timeout, the user can operate the MFP by masquerading. Further, the unauthorized user can steal confidential information of a high asset value.

As described above, the present MFPs cannot strictly manage a user authentication session and thus, for example, cannot conduct accurate charging in account management by counting the number of copied sheets, although the MFPs have a user authentication function. Further, when a confidential document is scanned, even a user who does not have a right to obtain the information can obtain the information by masquerading, which further causes a security problem that this action is recorded as another user's job in an operation log.

In order to solve the above-described problems, a user authentication session needs to be strictly managed. A session managing method is an example that is disclosed as countermeasures. This is a so-called network session management in which both sides communicating with each other constantly recognize each other while a WWW (world wide web) browser is communicating with a WWW server.

For example, Japanese Patent Laid-Open No. 11-212912 (corresponding to U.S. Pat. No. 6,587,880) discloses the following configuration: a browser provides information called a session identifier to a WWW server to access the WWW server, the WWW server requests verification of the session identifier to an identifier management server that manages the session identifier, and then the WWW server transmits a response to the browser based on the verification result.

According to Japanese Patent Laid-Open No. 11-212912, an authentication server manages a session identifier and the correctness of a network session is determined by adding the session identifier to information in a client-server communication. In this known technique, a server providing a service needs to transmit an inquiry to the authentication server every time the server wants to determine the correctness of a network session.

In this configuration of the known technique, the authentication server manages all network service sessions by centralized management. Therefore, the authentication server needs to control both authentication processing and session management, so that the performance thereof degrades when there are many nodes or many processing queues. Additionally, the authentication server needs to be changed when a service is newly added, which causes a scalability problem.

SUMMARY OF THE INVENTION

An aspect of present invention is directed to prevent malicious masquerade by strictly managing an authentication session of each job. Also, the present invention is directed to solve the problems of performance and scalability of the known art.

According to an aspect of the present invention, an image processing apparatus for providing at least a service to a service requester is provided. The image processing apparatus includes: a receiving unit configured to receive a service execution request and authentication information of the service requester from the service requestor; an authentication request issuing unit configured to issue a request for authenticating the service requester by using the authentication information to an authentication service in response to the reception of the service execution request by the receiving unit; an execution unit configured to execute a service requested by the service requestor based on an authentication result that is received from the authentication service as a response to the authentication request issued by the authentication request issuing unit; and a management unit configured to manage an execution state of the service executed by the execution unit and an authentication state of the service requestor by associating the execution state with the authentication state.

According to another aspect of the present invention, an image processing apparatus for providing at least a service to a service requester is provided. The image processing apparatus includes: a receiving unit configured to receive a service execution request and authentication information of the service requestor from the service requestor; a permitting unit configured to permit execution of a service requested by the service requestor in response to the reception of the authentication information of the service requestor and the service execution request by the receiving unit; an execution unit configured to execute the service permitted by the permitting unit; and a management unit configured to manage an execution state of the service executed by the execution unit and an authentication state of the service requestor by associating the execution state with the authentication state.

Further aspect and features of the present invention will become apparent from the following description of exemplary embodiments with reference to the attached drawings.

BRIEF DESCRIPTION OF THE DRAWINGS

FIG. 11 shows an example of a table showing the correspondence between user IDs and authority information.

FIG. 12 shows a specific example of an XML script 228.

FIG. 16 is a chart showing an exemplary flow from input of a user ID to the end of a job and abandonment of an authentication session.

DESCRIPTION OF THE EMBODIMENTS

Figure 1:
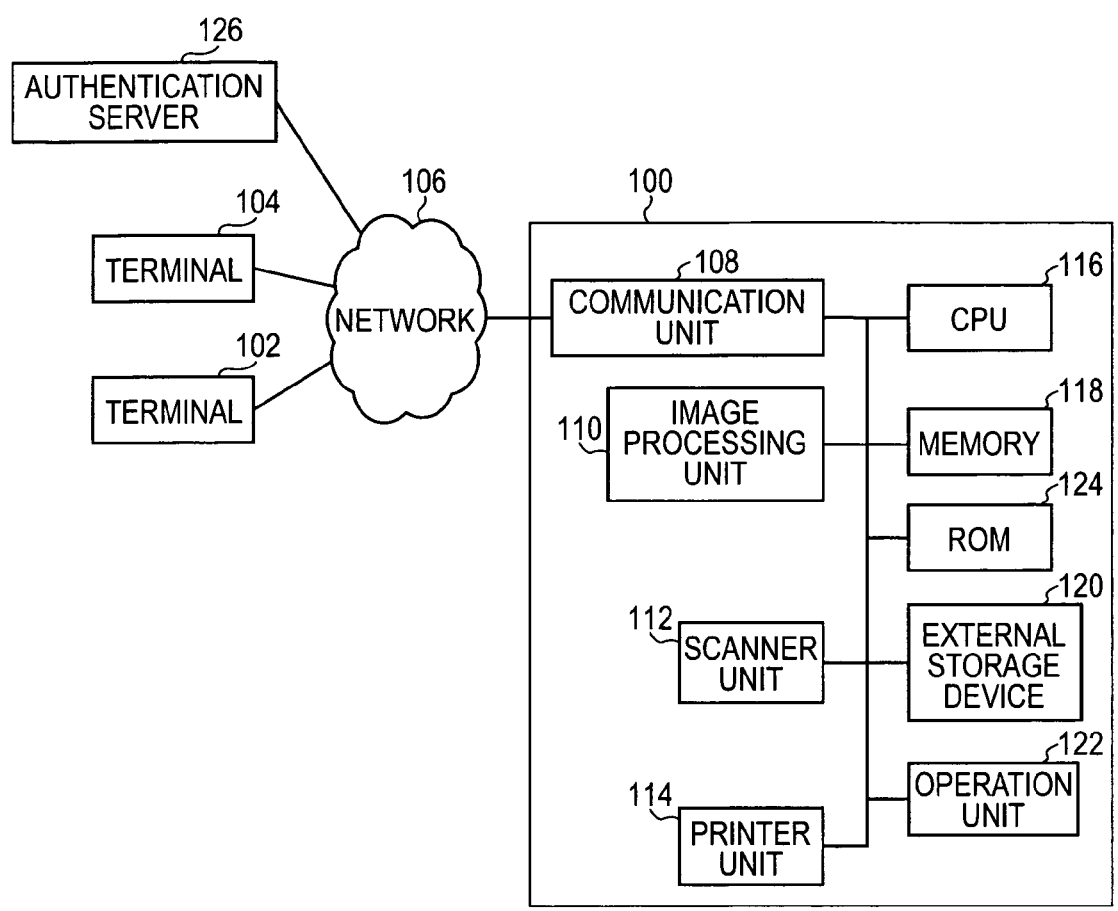
FIG. 1 is a block diagram of a system including an image processing apparatus according to an embodiment of the present invention.

Hereinafter, various embodiments, features and aspects of the present invention are now herein described with reference to the drawings.
Exemplary System Configuration FIG. 1 is a block diagram showing an exemplary system configuration in which an image processing apparatus (multifunction printer (MFP)) connects to computer terminals through a network, according to an embodiment of the present invention. In FIG. 1, an MFP 100 serving as an image processing apparatus is a network-compatible MFP that provides a print service, a scan service, a storage service, and a send service to computer terminals 102 and 104 (such as a conventional PC) through a network 106.

The print service is a service of providing a function of forming an image of image data or a print job transmitted from the computer terminal 102 or 104 in the MFP 100 and outputting the image. The scan service is a service of providing a function of scanning an image of a document and generating document image data in the MFP 100. The storage service is a service of providing a function of storing image data in an external storage device 120 of the MFP 100 or a function of operating image data stored in the external storage device 120. The send service is a service of providing a function of sending a facsimile, an e-mail, or a file in the MFP 100.

These aforementioned services provided by the MFP 100 can be operated by not only the computer terminals 102 and 104, but also in response to instructions through an operation unit 122 of the MFP 100 or an operation unit of another MFP (not shown) on the network.

The MFP 100 according to the embodiment has a reinforced service install function so that an application service can be added or deleted. Therefore, the added value of the MFP can be enhanced by installing an optional kit. An additional application service is installed in the external storage device 120.

A communication unit 108 communicates with the computer terminal 102 or 104 or another MFP (not shown) through the network 106. A central processing unit (CPU) 116 controls the MFP 100. Also, the CPU 116 executes programs to realize various functions in an image processing unit 110. More specifically, the CPU 116 reads programs (application programs or the like) for realizing various functions from the external storage device (a hard disk drive (HDD) is used in the embodiment) 120 or a read only memory (ROM) 124 and executes the read programs by using a memory 118 as a work area. The image processing unit 110 performs necessary image processing on various image data dealt with in the MFP 100.

A scanner unit 112 optically reads a document and generates image data based on the document. A printer unit 114 forms images based on image data generated by the scanner unit 112, image data stored in the external storage device 120, or a print job received from the computer terminal 102 or 104.

The external storage device 120 stores image data to realize the storage service provided by the MFP 100. Also, the external storage device 120 stores application programs executed by the CPU 116. In this embodiment, a hard disk drive (HDD) as a storage medium is used as the external storage device 120, but other nonvolatile storage media, such as a flash memory, may also be used.

The operation unit 122 functions as a user interface (UI) to receive instructions to operate the MFP 100 from a user and provide an operation screen to the user. In this embodiment, the operation unit 122 includes a display, such as a liquid crystal display (LCD), for receiving operations through a touch panel and hard keys, but another form may also be adopted. An authentication server 126 provides a user authentication and authorization service. The details thereof are described below.

Figure 8:
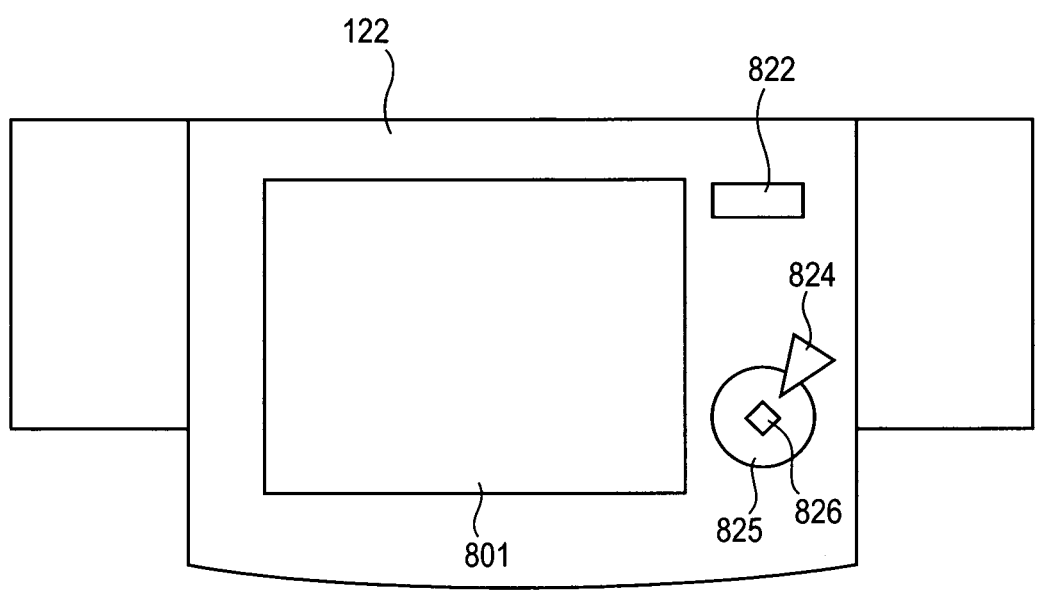
FIG. 8 is a schematic view showing an exemplary operation unit 122 of the MFP 100.

FIG. 8 shows an exemplary appearance of the operation unit 122. An LCD unit 801 includes a touch panel attached on an LCD and displays a system operation screen. When a key displayed thereon is pressed, information of the pressed position is transmitted to the CPU 116. A start key 825 is used to start execution of a job, e.g., to start reading a document image. A two-color LED (light emitting diode) 826 of green and red is placed at the center of the start key 825, the color thereof indicating whether the start key 825 can be used. A stop key 824 is used to stop an operation of the MFP 100. A reset key 822 is used to initialize the setting set through the operation unit 122.

Exemplary Logical Configuration of MFP

Figure 2:
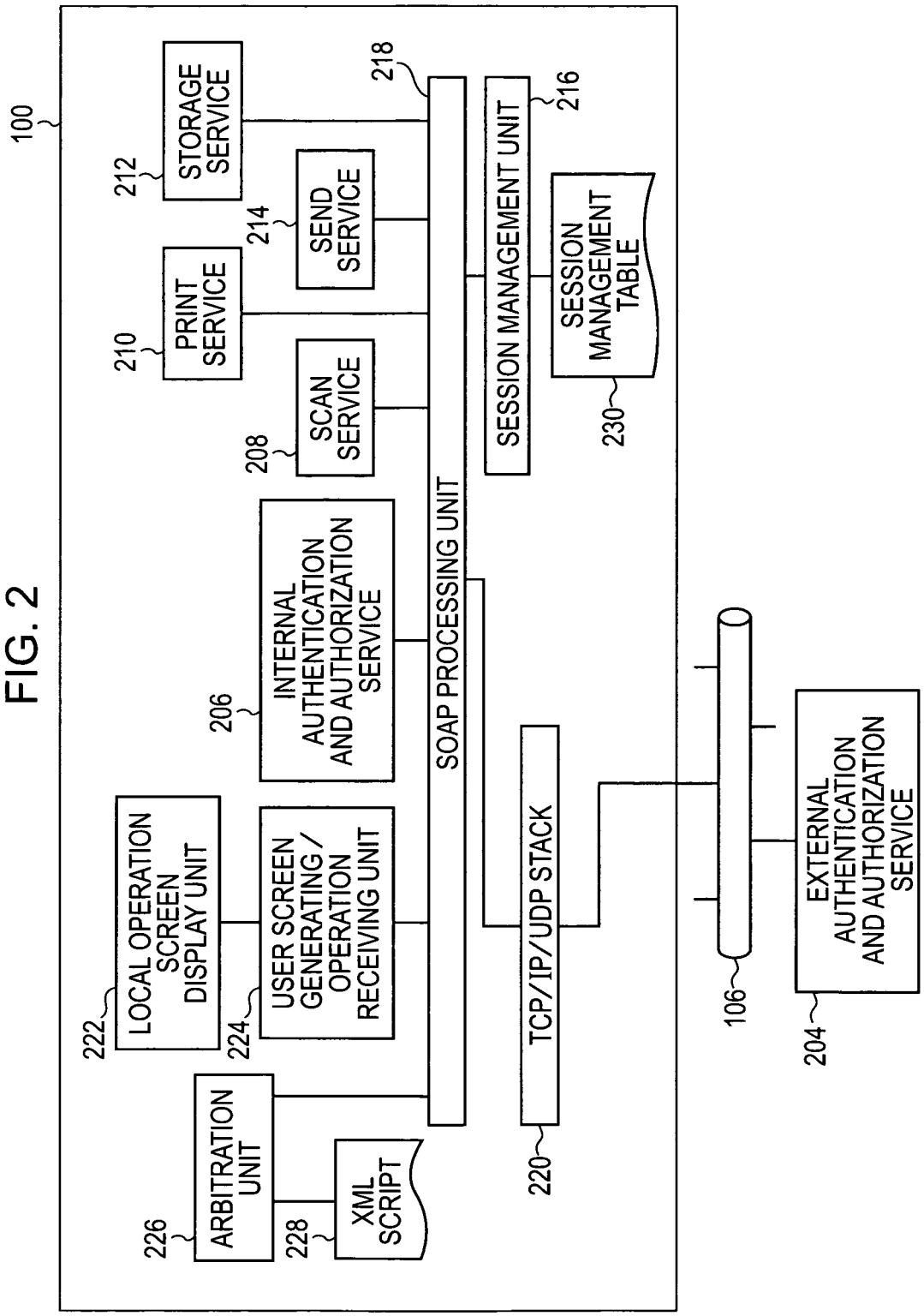
FIG. 2 shows an exemplary logical configuration of the system including the image processing apparatus according to the embodiment of the present invention.

FIG. 2 is a block diagram showing an exemplary logical configuration of the MFP 100. The MFP 100 shown in FIG. 2 corresponds the MFP 100 shown in FIG. 1, and a frame surrounding the MFP 100 is a logical boundary of the MFP 100. The MFP 100 connects to an external authentication and authorization service 204 (corresponding to the authentication server 126 shown in FIG. 1) through the network 106. The MFP 100 requests user authentication that is required to use a service provided by the MFP 100 to the authentication and authorization service 204.

The MFP 100 includes an internal authentication and authorization service 206. In this embodiment, whether the internal or external authentication and authorization service is used for user authentication is predetermined depending on a service installed in the MFP 100. The MFP 100 is additionally installed with a scan service 208, a print service 210, a storage service 212, and a send service 214 as Web service implementation. In the following description, the Web service may be simply called a service.

The scan service 212 is a Web service package for providing a function of capturing image data of a document scanned by the MFP 100 into the computer terminal 102 or 104 through the network 106. The print service 210 is a Web service package for providing a function of forming an image of image data or a print job transmitted from the computer terminal 102 or 104 in the MFP 100 and outputting the image. The print job is data to be printed which is generated by a printer driver of the computer terminal 102 or 104. By combining the scan service 208 and the print service 210, a copy function is realized.

The storage service 212 is a Web service package for providing a function of storing image data in the external storage device 120 of the MFP 100 and a function of operating image data stored in the external storage device 120. The stored image data can be taken out of the external storage device 120 and can be used for another service according to instructions from a user. By combining the storage service 212 and the print service 210, a box print function (a function of forming an image of image data stored in the external storage device 120 and outputting the image) can be realized.

An operation using these functions of the MFP 100 is called a job. For example, a copy job can be executed by executing the scan service and the print service. A box print function or a box print job can be executed by executing the storage service and the print service. In this embodiment, a job realized by executing a single service or a plurality of services is called a service job or a job.

The send service 214 is a Web service package for providing a function of sending electronic image data to an external facsimile device (not shown) in a known facsimile procedure, sending an e-mail in accordance with a simple mail transfer protocol (SMTP), or sending a file to an external file server or a computer terminal (not shown) in accordance with a file transfer protocol, such as a file transfer protocol (FTP) or a service message block (SMB).

Although some of the aforementioned functions of the MFP 100 are provided as Web service packages in this embodiment, these functions may be provided by another install method without using the Web service packages.

A session management unit 216 manages a job session of a service job (from start to end of the service job). The session management unit 216 holds a session management table 230 in order to manage sessions. After user authentication has been done and a job execution instruction has been provided, session management information (described below) is generated and is held in the session management table 230. The session management unit 216 identifies a user by performing user authentication before generating a job session. Also, the session management unit 216 abandons the job session upon receiving a job end response.

The MFP 100 includes a TCP/IP/UDP (transmission control protocol/Internet protocol/user datagram protocol) stack 220 as a communication function and connects to the network 106 therethrough so as to receive a service request for the print service 210 or the like from a computer (e.g., the terminal 102 or 104 shown in FIG. 1). The service request is interpreted by a SOAP (simple object access protocol) processing unit 218 and then a necessary Web service is called.

The MFP 100 includes a local operation screen display unit 222 (physically corresponding to the operation unit 122 shown in FIG. 1) so that a user can directly input a process request to the MFP 100. The local operation screen display unit 222 functions as local user interface (LUI), displays a screen operated by the user, and receives requests of processing, such as a copy service or a FAX service. The user inputs a user ID for identifying the user by using the local operation screen display unit 222 before using a Web service. The local operation screen display unit 222 has a mechanism to display an attribute setting screen according to a user authority of an input ID by cooperating with a user screen generating/operation receiving unit 224 (described below).

The attribute setting screen according to a user authority is displayed based on information about availability of a color/monochrome function, the limit of the number of sheets to be printed, availability of one-sided/two-sided setting or its forced setting, availability of "N in 1" setting (print setting for laying out N pages of scaled-down images in one sheet, also called "N up") or its forced setting, and so on. The information also includes setting information for displaying an operation screen that is customized for the user, in which the user's favorite function, setting, and operation screen layout are set, in the local operation screen display unit 222. Based on the above-described information, an operation screen unique to the user according to the user authority can be displayed in the local operation screen display unit 222.

The authority information is held in a table as shown in FIG. 11 while being associated with user IDs in the authentication and authorization services (204 and 206). FIG. 11 will be discussed in greater detail later in the specification. An operation screen unique to each user is displayed in the local operation screen display unit 222 based on the authority information. The user screen generating/operation receiving unit 224 is provided to generate a screen for each user according to the user authority.

Figure 9:
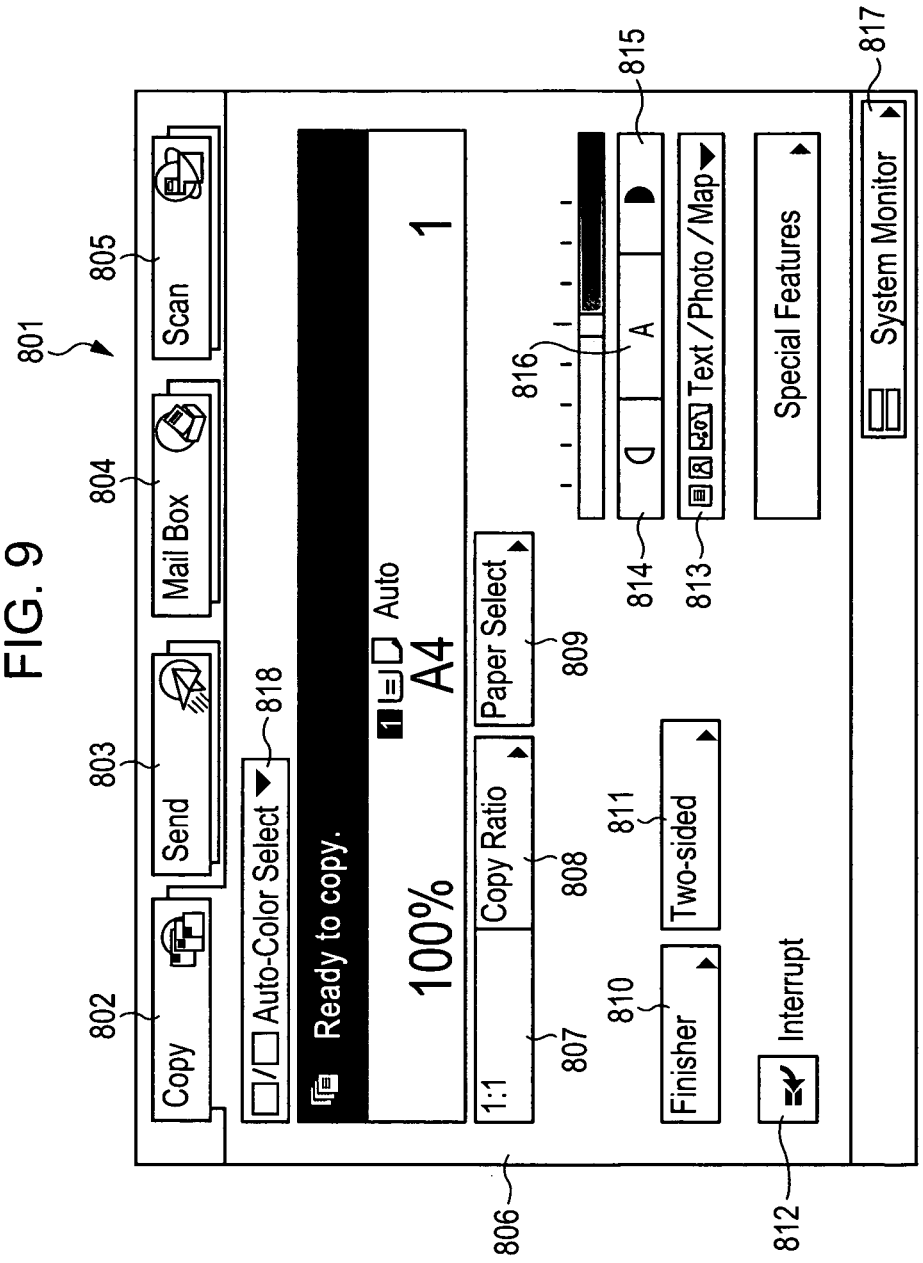
FIG. 9 shows an example of a screen displayed on the operation unit 122.

FIG. 9 is a screen displayed in the local operation screen display unit 222 (physically corresponding to the operation unit 122) and shows an example of a standard screen that is not unique to a user. As shown in FIG. 9, touch keys for a plurality of functions: a copy key 802, a send key 803, a mail box key 804, and a scan key 805, are displayed in the form of tabs at the top of an operation screen 801.

Still further, FIG. 9 shows an initial screen 806 of a copy function displayed when the copy key 802 is pressed. Also, a status message ("Ready to copy") indicating that the copy function can be executed is displayed at the top of the initial screen 806 of the copy function. Moreover, magnification, a selected paper cassette, and a deposit are displayed below the message.

Still referring to FIG. 9, it is noted that other touch keys for setting an operation mode of the copy function are also provided, e.g., a 1× magnification (1:1) key 807, a magnification key 808, a paper select key 809, a finisher key 810, a two-sided key 811, an interrupt key 812, and a text/photo/map key 813. Further, density adjusting keys: a left key 814 to decrease density, a right key 815 to increase density, and an auto key 816 to automatically adjust density, are displayed. The setting screens for setting an operation mode that cannot be displayed in the initial screen are hierarchically displayed by pressing an special features key.

By pressing a system monitor key 817, a screen indicating device information of the MFP 100 or a screen indicating a print job status (not shown) is displayed. A color mode select key 818 is used to specify a color copy or a monochrome copy or to specify an automatic selection of a color copy or a monochrome copy depending on a document. In the example shown in FIG. 9, automatic selection is set.

Figure 10:
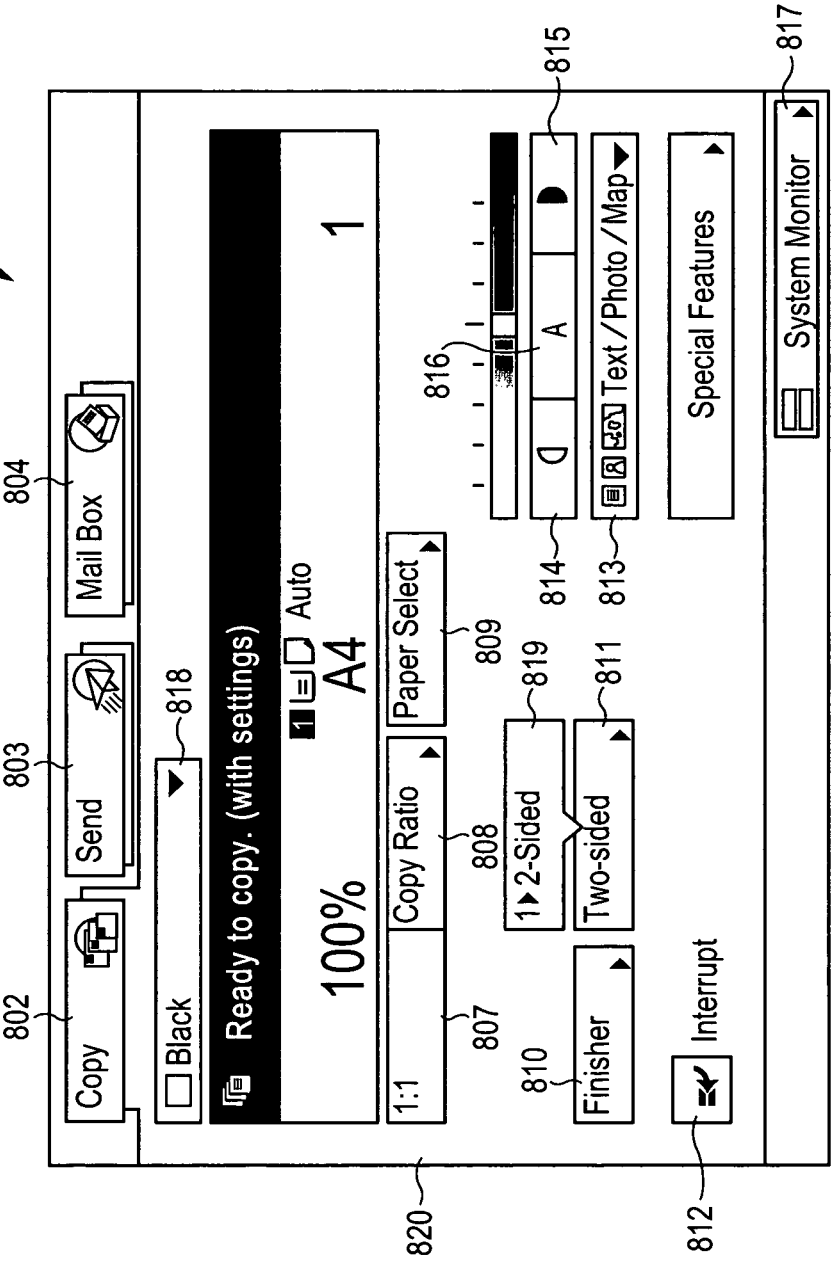
FIG. 10 shows an example of a screen unique to a user displayed on the operation unit 122.

FIG. 10 shows a screen displayed in the local operation screen display unit 222 (physically corresponding to the operation unit 122) and is an example of a screen unique to a user. In FIG. 10, parts that are the same as those in FIG. 9 are denoted by the same reference numerals.

Here, the screen 801 shown in FIG. 10 is for a user who is associated with authority information of "no color copy", "no scanning", and "forced two-sided copy". This screen is displayed after the user performed user authentication in the MFP 100. Since the authority information indicates "no color copy", the color mode select key 818 is compulsorily set to "Black", so that the user cannot select another mode by pressing the color mode select key 818. Also, since the authority information indicates "no scanning", the scan key 805, that is displayed in FIG. 9, is not displayed. Further, since the authority information indicates "forced two-sided copy", the two-sided key 811 is pressed and a setting 819 for two-sided copy of one-sided document is displayed. In this case, the user cannot change the setting to one-sided copy by pressing the two-sided key 811.

FIG. 11 shows an example of a table 1100 showing exemplary correspondence between the user IDs held in the authentication and authorization services 204 and 206 and authority information. In the table 1100 shown in FIG. 11, an item 1102 is a user ID, items 1104, 1106, 1108, 1110, and 1112 are authority information, and an item 1114 is setting information to customize the content displayed in the operation screen 801 in the operation unit 122. For example, the user having a user ID "690 MB" cannot use the scan service, is prohibited from using color output, and is forced to do two-sided print. A screen unique to this user generated based on the authority information corresponds to the screen shown in FIG. 10.

The customization setting 1114 is an item for storing a favorite operation screen setting of each user. This item 1114 does not deal with authority information unlike the items 1104, 1106, 1108, 1110, and 1112, but the entire information set in the table 1100 including the customization setting 1114 is called authority information in this embodiment.

Now, referring back to FIG. 2, in order to specify authority information of a user, the user needs to be identified through authentication. A user ID is used as user identification information to specify the user. Reception of the user ID and input of a PIN (personal identification number) code required in a later user identification sequence are performed by the user screen generating/operation receiving unit 224. Also, input of biometrics information such as fingerprint information or read of IC card information in IC card (also called a smart card) authentication are performed by the user screen generating/operation receiving unit 224.

Identification of a user and authorization are performed in a series of steps called user authentication. The user authentication is performed by an arbitration processing unit 226 and the internal authentication and authorization service 206 or the external authentication and authorization service 204 shown in FIG. 2.

The arbitration processing unit 226 has a function of assigning each user authentication request to an appropriate authentication and authorization service (204 or 206) when different authentication and authorization services are specified in respective services. For example, user authentication is performed by the internal authentication and authorization service 206 in the scan service 208, the print service 210, and the storage service 212, whereas user authentication is performed by the external authentication and authorization service 204 in the send service 214. In this way, the arbitration processing unit 226 assigns each user authentication request to an appropriate authentication and authorization service (204 or 206).

It is noted that although the two authentication and authorization services 204 and 206 are used in this embodiment, three or more authentication and authorization services may be used. Further, the plurality of authentication and authorization services may be provided either inside or outside the MFP 100.

The correspondence between the respective services and the authentication and authorization services are stored in advance in a mapping table. An XML (Extensible Markup Language) script 228 has the mapping table and holds information about an association between Web services and authentication and authorization services. The arbitration processing unit 226 determines an authentication and authorization service to which a user authentication request should be transmitted by referring to the XML script 228. When a Web service is added or deleted, the XML script 228 is updated accordingly. By providing the XML script 228, the authentication and authorization service (authentication server) need not be changed even when a new Web service is added and the scalability can be enhanced.

FIG. 12 shows an example of the XML script 228 which uses the file name "Sample1". In a description 1201, the print service 210 is associated with an authentication and authorization service A. In a description 1202, the scan service 208 is associated with an authentication service B. In a description 1203, the storage service 212 is associated with an authorization service B. In a description 1204, the send service 214 is associated with an authentication and authorization service C. Accordingly, the arbitration processing unit 226 can assign different authentication and authorization services to the respective Web services.

Exemplary Program for Realizing the Logical Configuration

An exemplary logical configuration of the MFP 100 according to the embodiment has been described above. A program for realizing this logical configuration is realized by a group of the plurality of above-described logical function components. The plurality of logical function components can realize the function of the MFP 100 by performing predetermined sequential operations while being associated with each other. The sequential operations are installed as a logical function of the SOAP processing unit 218.

Now, these exemplary processes according to the embodiment are described with reference to FIGS. 3 to 7. The processes shown in FIGS. 3 to 7 are realized when the CPU 116 of the MFP 100 executes a program that is loaded from the ROM 124 or the external storage device 122 to the memory 118.

Figure 3:
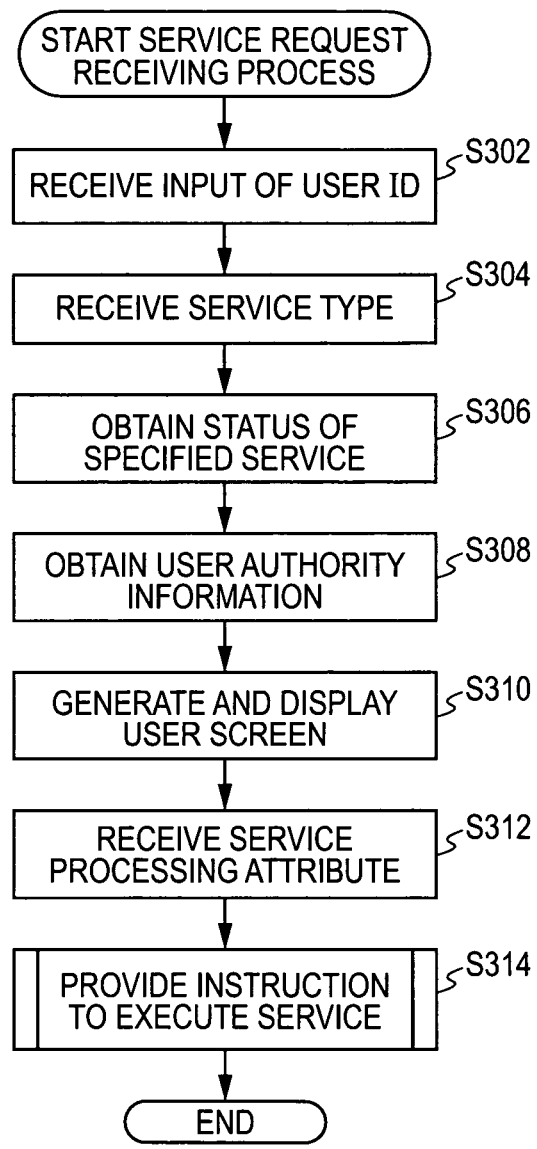
FIG. 3 is a flowchart showing an example of a process of receiving a service request from a user performed in the image processing apparatus.

FIG. 3 is a flowchart of an exemplary service requesting process performed when a user wants to use a service. First, the user inputs a user ID before specifying a service (step S302). This step is performed to identify the user who requests a service. Various methods can be used to input the user ID. For example, the user ID can be directly input from the user screen generating/operation receiving unit 224 through the local operation screen display unit 222 by displaying the operation screen shown in FIG. 13. Alternatively, a contact or noncontact IC card reader (not shown) provided in the MFP 100 can be allowed to read the IC card of the user. The user ID information is received by the user screen generating/operation receiving unit 224 and is held by the SOAP processing unit 218.

Figures 13, 14:
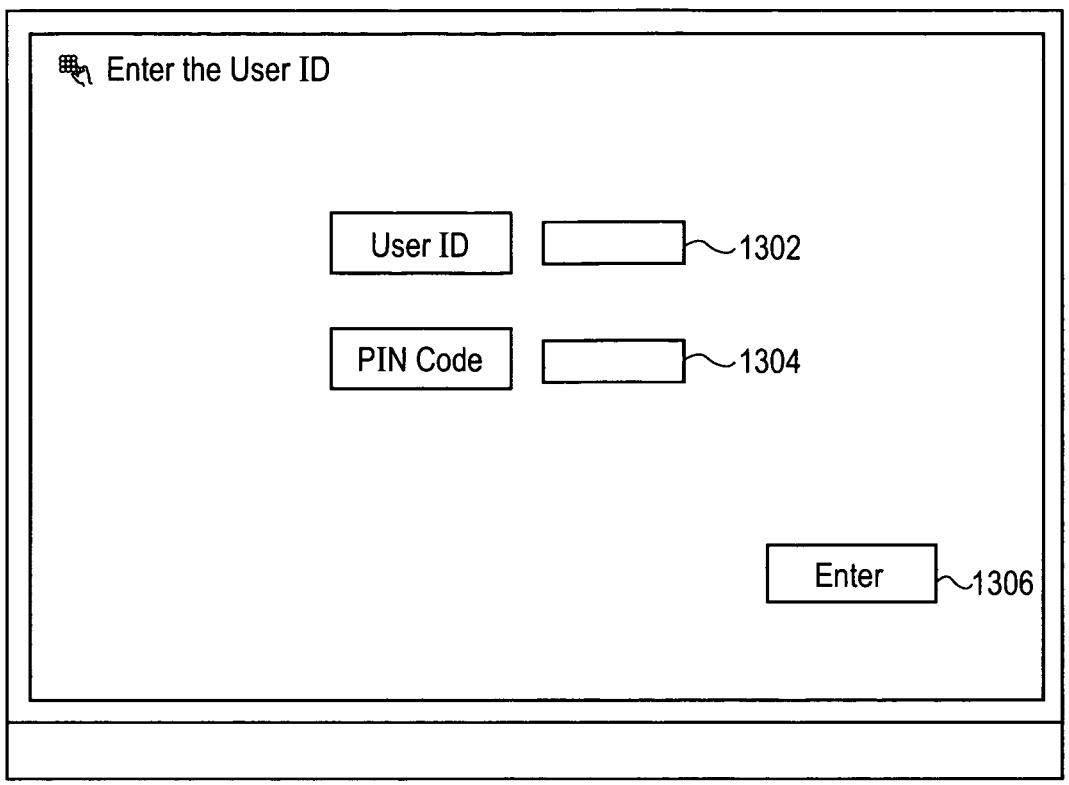
FIG. 13 shows an example of an operation screen for inputting a user ID.
FIG. 14 shows an example of a session management table 230.

FIG. 13 shows an exemplary user ID input screen that is displayed in the LCD unit 801 of the operation unit 122. The user inputs a user ID in a user ID input section 1302 by using a numeric keypad or a keyboard (not shown) and presses an enter key 1306. Herein, a PIN code may or may not be input in a PIN code input section 1304. Alternatively, the PIN code input section 1304 may not be displayed in FIG. 13.

Referring back to FIG. 3, the user is able to operate the user screen generating/operation receiving unit 224 of the MFP 100. Therefore, the user specifies a service type to be used through the user screen generating/operation receiving unit 224 (step S304). The service type is specified by pressing a service button or by selecting a tab for specifying a service attribute displayed on the screen. Information of the service type specified by the user is held by the SOAP processing unit 218.

Next, the SOAP processing unit 218 obtains the status of the specified service based on the service type information (step S306). The status of the service is, for example, paper jam, paper out, toner out, or out of order or the MFP 100.

On the other hand, the SOAP processing unit 218 can obtain authority information of the user who has specified this service job because it holds user identification information and service type information. The authority information is held in the authentication and authorization service 204 or 206. Thus, the SOAP processing unit 218 transmits the service type information to the arbitration processing unit 226 so as to search for the authentication and authorization service having the authority information of the user. After finding the authentication and authorization service to access, the SOAP processing unit 218 accesses the specified authentication and authorization service by using the user ID information and obtains the user authority information about the service for the user ID (step S308).

The SOAP processing unit 218 transmits the obtained user authority information to the user screen generating/operation receiving unit 224, and the user screen generating/operation receiving unit 224 generates an operation screen unique to the user (step S310). This screen is unique to the user and the user authority information is reflected thereon, and thus attributes that cannot be specified by the user are eliminated in this stage.

When a touch panel is used in the operation unit 122, setting buttons corresponding to unavailable functions may be grayed out (visible limitation). In this approach, however, the user authority information can be leaked to other people because user authentication has not been done at this stage. For example, other people can know the functions that are usable/unusable by the user. In order to prevent such a trouble, invisible limitation can be set. That is, setting buttons are displayed in the operation unit 122 in a usual manner, such that the user can press a setting button of an unusable function but the press of the button is not accepted.

After the operation screen unique to the user is displayed, specification of a series of service attributes about the service processing by the user is received (step S312), and then the user provides an instruction to execute the service job (S314). The instruction to execute the job can be provided by pressing the start key 825 provided in the operation unit 122. When a fingerprint reading sensor is mounted on the operation unit 122, user authentication and instruction to execute the job can be concurrently performed when the user touches the fingerprint reading sensor.

In that case, the fingerprint reading sensor is incorporated in the start key 825 or the fingerprint reading sensor is configured to function as both sensor and start key. With this configuration, the user can perform an operation for user authentication and provide an instruction to start a job by one action, and thus an increased convenience can be obtained. When the fingerprint reading sensor is not provided in the operation unit 122, the user performs an operation for user authentication (input of a PIN code) and then presses the start key 825.

Figure 4:
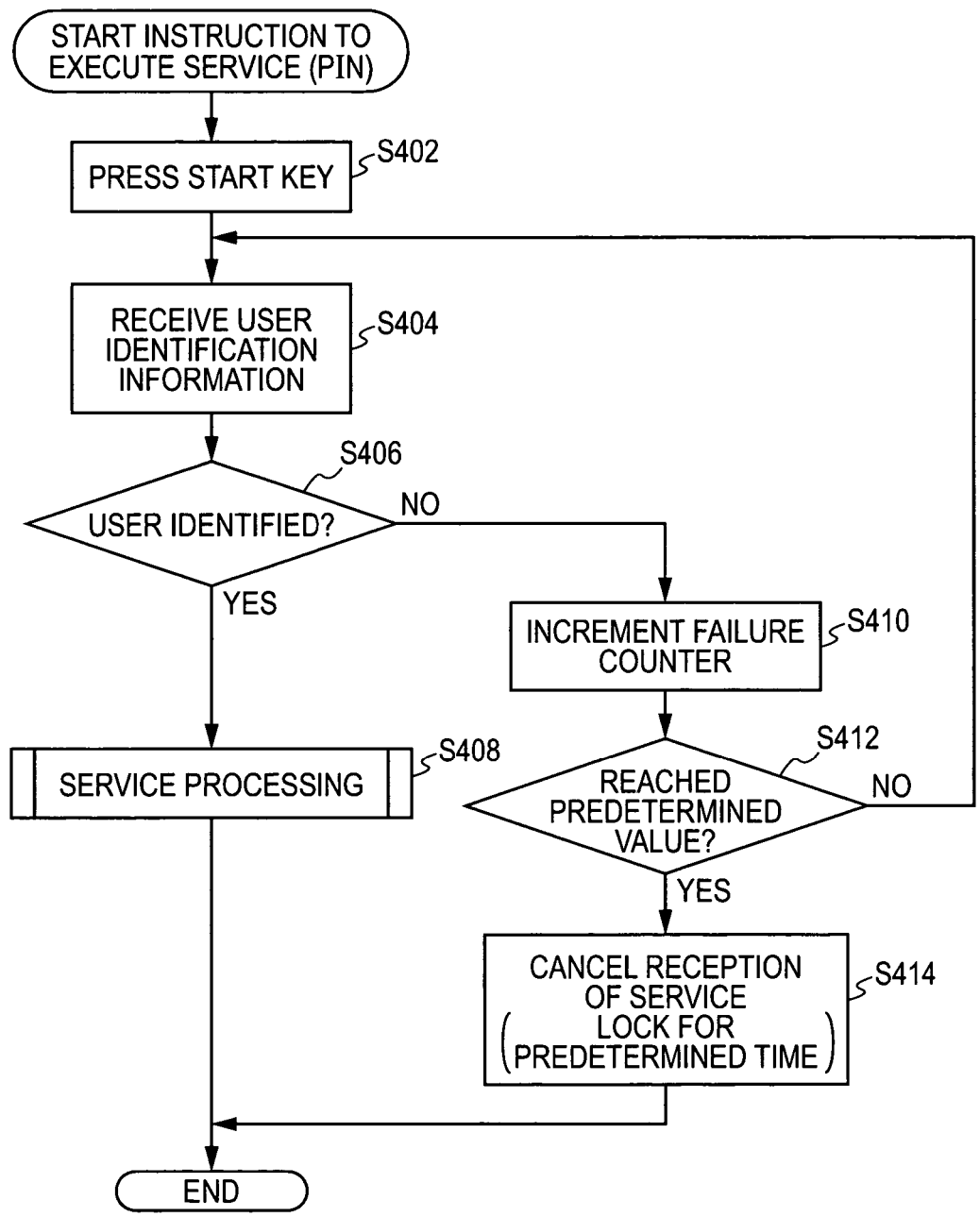
FIG. 4 is a flowchart showing an exemplary process of providing an instruction to execute a service in a case where a PIN code authentication method is used.

FIG. 4 is a flowchart showing an exemplary sub-routine of providing an instruction to execute the service (step S314) of FIG. 3 and illustrates a service execution processing flow according to a PIN authentication method. When the user provides an instruction to execute the service (step S314) in the service requesting process shown in FIG. 3, the service execution instructing flow shown in FIG. 4 starts. This processing flow includes a step of user authentication and thus there are various possible flows depending on the method of user authentication. The processing flow shown in FIG. 4 is based on a user authentication method using a PIN code.

Before starting this sub-routine, a failure counter (described below) is set to zero (cleared). Although the failure counter is provided in the memory 118 in this embodiment, another method may also be used, e.g., an independent counter may be provided.

The instruction to execute the service is started when the start key 825 on the operation unit 122 of the MFP 100 is pressed (step S402). In a known MFP, a specified process starts in response to a press of the start key 825. On the other hand, in the MFP according to this embodiment, reception of user identification information is performed (S404) after the start key 825 is pressed. That is, a screen for inputting a PIN code for identifying the user appears in the local operation screen display unit 222. The user inputs a PIN code by operating a numerical keypad (composed of hard keys (not shown)) in the operation unit 122 or a soft keyboard displayed in the LCD unit 801.

Figure 15:
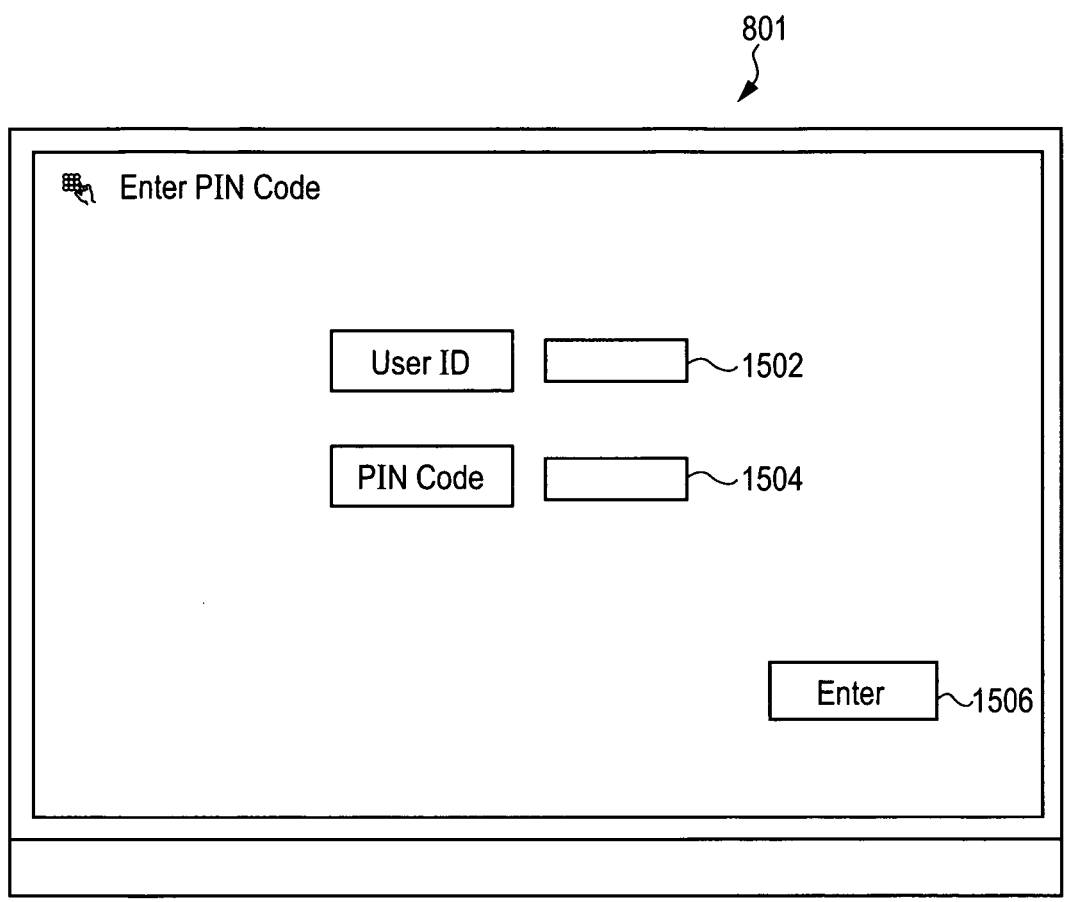
FIG. 15 shows an example of an operation screen for inputting a PIN code.

FIG. 15 shows an example of a PIN code input screen 801. The screen shown in FIG. 15 is similar to the user ID input screen shown in FIG. 13. Herein, the user inputs a PIN code that is known only by the user in an input section 1504 by using hard keys or a keyboard (not shown). The PIN code is secret information of predetermined digits constituted by a combination of numerals and characters. The user may or may not input the user ID in a user ID input section 1502, because the user ID has already been input in the user ID input screen shown in FIG. 13 and is held by the SOAP processing unit 218. Therefore, the user ID input section 1502 may not be displayed in the screen shown in FIG. 15.

In order to reinforce the security function, a password space can be widened or a PIN code of a larger number of digits can be set. Also, a series of user authentication steps can be temporarily stopped if failure of user identification occurs a predetermined number of times, so that the security function can be reinforced.

After inputting the PIN code in the input section 1504, the user presses an enter key 1506 to confirm input of the PIN code. The PIN code input by the user is checked by the predetermined authentication and authorization service 204 or 206. Note that, user ID information required for user authentication was input and the service was specified by the user in steps S302 and S304 shown in FIG. 3, and the information thereof is temporarily held in the SOAP processing unit 218.

Now referring back to FIG. 4, identification of the user (step S406) is performed by the specified authentication and authorization service 204 or 206 based on the user ID held by the SOAP processing unit 218 and the PIN code input by the user in step S404. Then, when the SOAP processing unit 218 receives an authentication result, user authentication is completed. Information indicating that the user has been authenticated is managed by the SOAP processing unit 218.

If user authentication of step S406 has successfully been done, service processing is performed (step S408). On the other hand, if user authentication could not successfully been done in step S406, subsequent steps are performed for re-authentication. That is, the user identification failure counter is incremented (step S410). Then, it is determined whether the value of the failure counter has reached a predetermined value (S412). If the value has not reached the predetermined value (NO in step S412), input of a PIN code is received for re-authentication (step S404). If the value has reached the predetermined value, (YES in step S412), reception of the service is canceled (step S414) and the process ends.

After reception of the service was canceled in step S414, reception of user authentication is locked for predetermined time before receiving re-authentication. Also, the failure counter is cleared before receiving the re-authentication.

Figure 5:
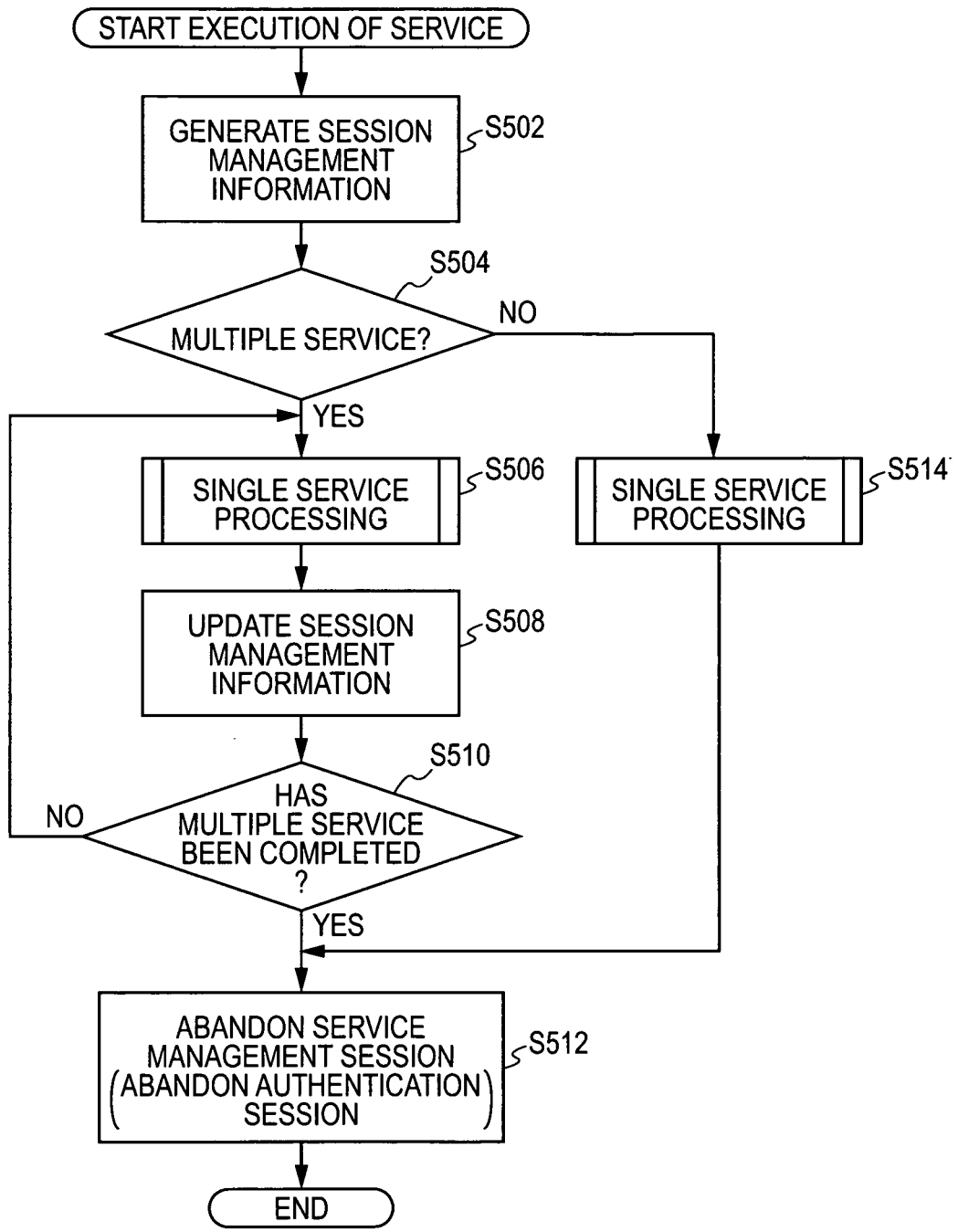
FIG. 5 is a flowchart showing exemplary details of the service processing shown in FIG. 4.

FIG. 5 is a flowchart of an exemplary sub-routine of executing the service (step S408), performed after user authentication is successfully done in step S406 in FIG. 4. In order to manage a job session specified by the user, management information of the job session (hereinafter referred to as session management information) is generated in the processing flow shown in FIG. 5. This series of steps are performed by the SOAP processing unit 218 and the session management unit 216. The generated session management information is held in the session management table 230 by the session management unit 216. The session management table 230 is physically stored in the external storage device 120. FIG. 5 will be discussed in greater detail later in the specification.

FIG. 14 shows an example of the session management table 230. The session management table 230 includes job identification information 1402 for uniquely identifying each job, information about a service processing flow 1406, and user identification information 1404 (corresponding to the user ID 1102 shown in FIG. 11). Each row constituting the session management table 230 is the session management information of a job indicated by the job identification information.

The information about a service processing flow 1406 includes single/multiple identification information 1408, service configuration information 1410, and service-in-execution information 1412. The single/multiple identification information 1408 indicates whether the job is a single service or a multiple service. The service configuration information 1406 indicates the type of service. When the service is a multiple service, the service configuration information 1406 indicates the type and order of respective single services constituting the multiple service. The service-in-execution information 1412 indicates a single service that is currently being executed in a multiple service.

Now, a single service and a multiple service according to this embodiment and so on are described. In this embodiment, a job that can be independently executed, such as the scan service 208, the print service 210, the send service 214, and the storage service 212 of the MFP 100, is called a single service. A copy service and a scan to send service (a service for providing a function of scanning a document and sending it by facsimile or the like) are multiple services that are provided by combining these single services. The single service is realized by a logical component of the scan service 208, the print service 210, the storage service 212, or the send service 214. Physically, the single service is realized by the scanner unit 112, the printer unit 114, the communication unit 108, or the external storage device 120 shown in FIG. 1.

Now referring back to FIG. 5, after user authentication has successfully been done and service processing has started (step S408 in FIG. 4), session management information is generated in the session management table 230. The generated session management information is associated with the authenticated state of the user who has requested the service, the authenticated state being managed in the SOAP processing unit 218 (step S502).

As an example of the session management information managed in the session management table 230, job identification information 0001 shown in FIG. 14 is described. This exemplary job is a copy job as a multiple service in which a scan service and a print service are performed in this order. The information indicates that the scan service is now being executed. On the other hand, job identification information 0002 is a print job that can be realized only by a print service.

Then, in step S504, it is determined whether multiple service processing needs to be performed by referring to the information about a service processing flow 1406 in the session management information. This determination is performed at this step because the job session needs to be maintained until all services have been completed in a multiple service.

If the service is a multiple service (YES in step S504), respective single services are performed in accordance with the content of the information about a service processing flow 1406 (a loop of steps S506 to S510). For example, when the user has specified a copy service, a scan service and a print service are performed in this order. After a single service has been done (step S506), the session management information of the job in the session management table 230 is updated according to that state (step S508). Accordingly, it can be determined which service should be performed as a next single service.

The update of the session management information (step S508) may be performed before the entire first single service has been done, that is, after part of the first single service has been done, depending on the type of multiple service. For example, the copy service is a multiple service including a scan service and a print service. When a plurality of pages are to be copied, the print service does not need to wait until all of the pages have been scanned by the scan service. Rather than that, printing should be started just after the first page was scanned in terms of productivity. In such a case, the session management information needs to be updated at an optimal timing so that execution of the print service starts just after the first page was scanned. In this case, the scan service and the print service are executed at the same time in a certain period.

The session management information is updated in step S508 so that it can be determined which service of the multiple service has been done and which service has not been done. Then, in step S510, it is determined whether the multiple service has been completed. If the multiple service has not been completed, the process returns to step S506 where an uncompleted single service is performed. On the other hand, if all single services have been done and the multiple service has been completed, the service management session is abandoned (step S512).

The abandonment of the service management session (step S512) is performed to securely exit the state where the user is authenticated. By managing the job session and the state where the user is authenticated while associating them with the service session, the state where the user is authenticated can be securely ended (logoff) at completion of the job. Accordingly, a threat of malicious masquerade can be eliminated.

Further, since the last service of the job session can be determined by referring to the session management information, a timing to end the user authenticated state can be easily determined even when a job of a multiple service is performed. Further, user authentication need not be performed for each single service even when the executed job is a multiple service, and thus degradation of the performance of the authentication and authorization service 204 or 206 can be prevented.

Figure 6:
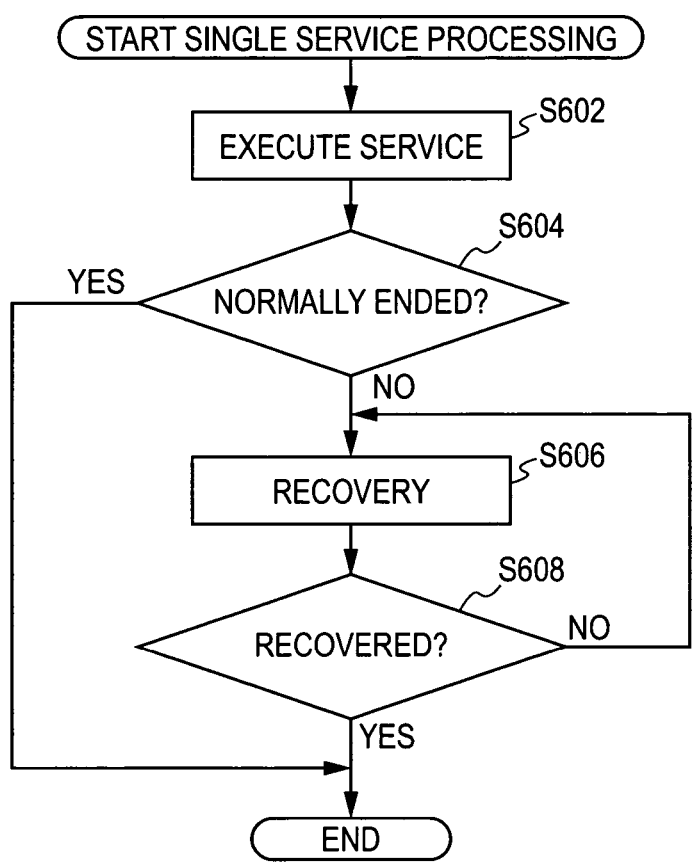
FIG. 6 is a flowchart showing exemplary details of the single service processing shown in FIG. 5.

On the other hand, when the service job specified by the user is a single service, single service processing is performed (step S514). After the service has been performed, the service management session is immediately abandoned (step S512) because the session management table need not be updated in a single service. FIG. 6 is a flowchart illustrating an exemplary sub-routine of the single service processing performed in step S506 or S514 in FIG. 5. A single service is performed at step S602. At this stage, the user has been identified (steps S302 and S402) and the processing attribute of the job has been specified (step S312). Thus, the single service only has to perform a job in accordance with the specified service processing attribute.

After processing of the service has ended, it is determined whether the service has been normally ended based on the processing status (step S604). For example, if the job stops due to paper jam or the like, recovery from the paper jam is performed (step S606). Then, it is determined whether recovery has normally completed (step S608). When it is determined that recovery has normally completed (YES in step S608), the single service processing ends. Otherwise (NO in step S608), the process returns to step S606. While, if in step S604 the service has normally ended, the single service processing ends.

FIG. 16 is a chart showing an exemplary flow from input of a user ID (step S302) to the end of a job and abandonment of an authentication session (step S512). As can be seen in this chart, start and end of the user authentication session match those of the job session.

As described above, the service processing specified by the user completes after the processes shown in FIGS. 3 to 6 and also the state where the user is authenticated automatically ends. In this method, since user authentication is required for each job and the user authenticated state is compulsorily released upon completion of the job, an unauthenticated user cannot use a login session of the authenticated user. Accordingly, a malicious masquerade can be prevented.

The user authentication using a PIN code described in FIG. 4 can be replaced by another authentication method, for example, authentication using a fingerprint. In that case, a different process is performed. Hereinafter, an exemplary process performed when a fingerprint authentication device is provided in the MFP 100 is described with reference to FIG. 7.

The fingerprint authentication device reads a fingerprint of a user, instead of a PIN code, by using a sensor and verifies the fingerprint data so as to identify the user. In this method, the user need not input a PIN code and operations performed by the user to execute a job can be reduced, so that an increased convenience can be obtained. When the fingerprint authentication is adopted, the instruction to execute a service provided in step S314 of FIG. 3 is different from that provided when the PIN code authentication is adopted in a series of steps to specify service processing.

Figure 7:
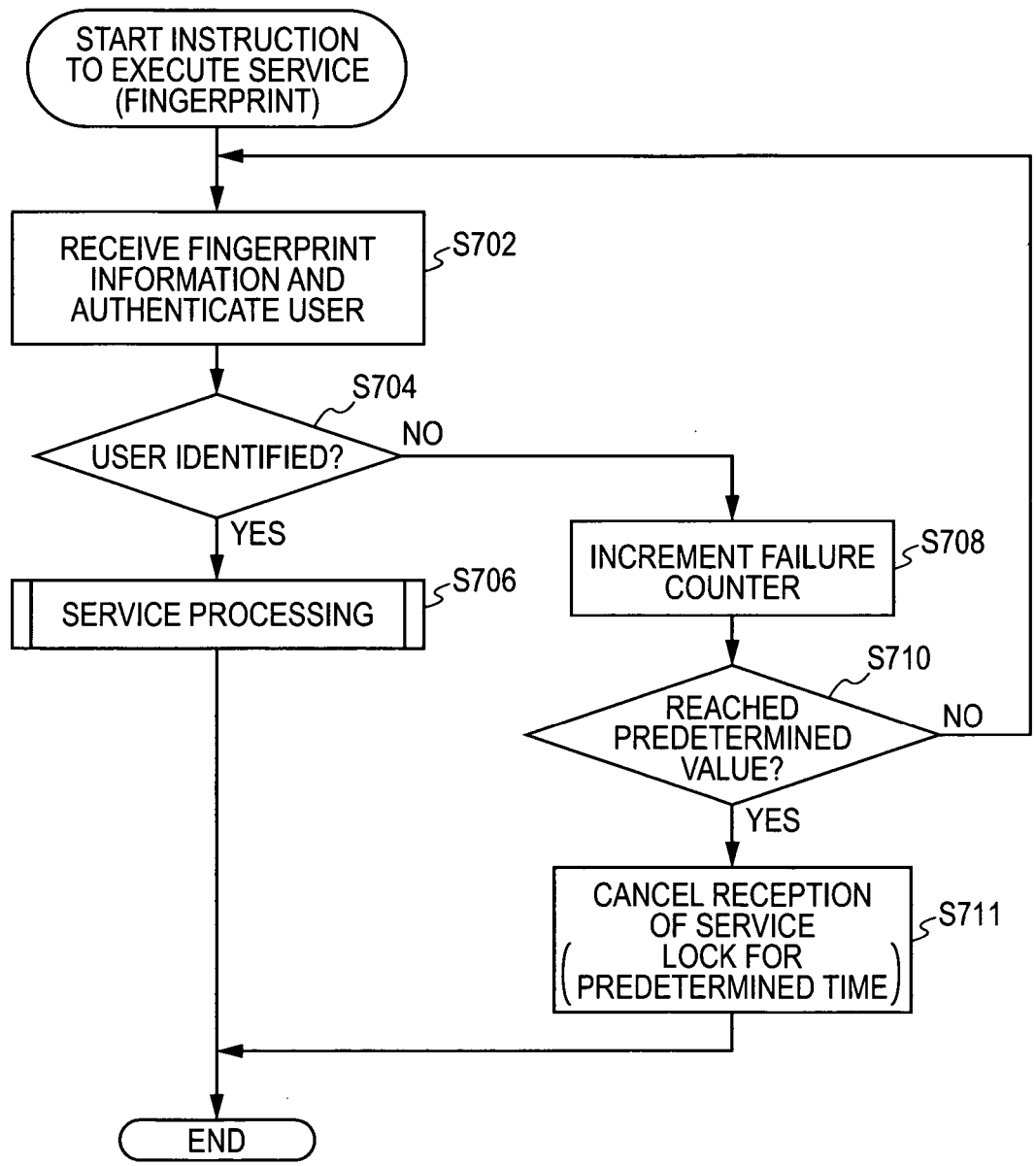
FIG. 7 is a flowchart showing an exemplary process of providing an instruction to execute a service in a case where a fingerprint authentication method is used.

Referring to FIG. 7, fingerprint information is received to authenticate the user (step S702). At this stage, the user has specified a service processing attribute (step S312). More specifically, in step S702, the user allows a fingerprint sensor to read his/her fingerprint. In this embodiment, the fingerprint sensor (not shown) is provided in the MFP 100 and functions as a part of the fingerprint authentication device. Also, in this embodiment, the fingerprint sensor is provided in the operation unit 122.

The fingerprint sensor identifies the user by using fingerprint data of the user that has been registered in advance (step S704). After the user has successfully been identified, service processing is immediately performed (step S706, similar to step S408 in FIG. 4). At this time, the user does not need to press the key to execute the service because the fingerprint reading process in the fingerprint sensor serves as an instruction to execute the service.

If the user cannot be identified, re-authentication is performed. As in the process shown in FIG. 4, the number of times of fingerprint authentication is limited. If an authentication failure occurs a predetermined number of times, reception of a service is stopped for predetermined time. In order to realize this function, a failure counter (not shown) is provided and the failure counter is incremented every time an authentication failure occurs (step S708).

The value of the failure counter is monitored by an internal process so that whether the value has reached a preset value is determined (step S710). When the value reaches the predetermined value, next reception of a service is stopped for predetermined time as described above (step S711). Otherwise, the process returns to step S702 to perform fingerprint authentication again.

After the processing flow shown in FIG. 7 has completed, the instruction to execute a service (step S314) shown in FIG. 3 is also completed, and the service request receiving process shown in FIG. 3 ends. In the service processing (step S706) shown in FIG. 7, the processing flows shown in FIGS. 5 and 6 may be performed as internal routines.

Other Exemplary Embodiments, Aspects and Features of the Present Invention

The present invention can be applied to a system composed of a plurality of apparatuses (e.g., a host computer, an interface apparatus, a reader, and a printer) or a single apparatus (e.g., a copying machine or a facsimile apparatus).

The present invention can be carried out by supplying a storage medium storing a program code of software to realize the function of the above-described embodiment to a system or an apparatus and by allowing a computer (or CPU or MPU) of the system or the apparatus to read and execute the program code stored in the storage medium. In such a case, the program code read from the storage medium realizes the function of the above-described embodiment, and thus the storage medium storing the program code constitutes the present invention.

Examples of the storage medium to supply the program code include a Floppy® disk, a hard disk, an optical disc, a magneto-optical disc, a CD-ROM (compact disc read only memory), a CD-R (compact disc recordable), a magnetic tape, a nonvolatile memory card, flash memory, ROM and so on.

The function of the above-described embodiment may be realized by allowing the computer to execute the read program code. Also, the function of the above-described embodiment may be realized by allowing an operating system (OS) or the like operating in the computer to execute part or all of actual processing based on instructions of the program code.

Further, after the program code read from the storage medium is written in a memory of a function expanding board inserted into the computer or a function expanding unit connected to the computer, a CPU or the like provided in the function expanding board or the function expanding unit may execute part or all of actual processing based on instructions of the program code. With this processing, the function of the above-described embodiment may be realized.

As described above, according to the embodiment, a job session of each service job is managed while being associated with a user who requests issue of the job. Accordingly, masquerade situations can be prevented.

Further, the authentication server does not perform centralized management of job sessions but the image processing apparatus manages a user authentication session as a job session. With this configuration, degradation of the processing performance of the authentication server can be prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-371063 filed Dec. 22, 2004, and related Japanese Application 2005-316715 filed Oct. 31, 2005, both of which are hereby incorporated by reference herein in its entirety.

What is claimed is:

1. An image processing apparatus comprising:
a receiving unit configured to receive a request for an image processing service and authentication information of a service requesting user;
an authentication request issuing unit configured to issue a request for authenticating the service requesting user to an authentication service in response to the reception of the request for the image processing service received by the receiving unit;
a processor configured to execute the image processing service requested by the service requesting user based on an authentication result received from the authentication service in response to the authentication request issued by the authentication request issuing unit; and
a management unit configured to manage information about an execution status of the image processing service executed by the processor and an authentication state of the service requesting user in an association with each other, and to change the authentication state of the service requesting user corresponding to the image processing service from an authenticated state to an authentication end state in response to the completion of the execution of the image processing service.

2. The image processing apparatus according to claim 1, wherein the image processing apparatus is configured to provide a plurality of image processing services to the service requesting user, and
wherein at least one of the image processing services provided by the image processing apparatus is a multiple service provided to the service requesting user by the processor executing a plurality of single image processing services.

3. The image processing apparatus according to claim 2, wherein the management unit manages information about each single image processing service constituting a multiple service in association with the service requesting user.

4. The image processing apparatus according to claim 3, wherein the management unit manages an execution order of the single image processing services constituting the multiple services and changes the authentication state of the service requesting user associated with the multiple service from the authenticated state to the authentication end state after the last single image processing service has been completed.

5. The image processing apparatus according to claim 1, wherein the receiving unit includes a display unit configured to display an operation screen for receiving an operation from the service requesting user and displays an operation screen unique to the service requesting user upon receiving information specifying the image processing service from the service requesting user.

6. The image processing apparatus according to claim 1, wherein the image processing service includes at least one of a print service, a scan service, an image send service, and a storage service.

7. The image processing apparatus according to claim 1, wherein the image processing service includes a Web service.

8. The image processing apparatus according to claim 1, further comprising a permitting unit configured to permit or inhibit execution of the image processing service requested by the service requesting user,
wherein the processor executes image processing as the image processing service requested by service requesting user when the execution of the service is permitted by the permitting unit.

9. A method utilized in an image processing apparatus for controlling the image processing apparatus, the image processing apparatus including a receiving unit, an authentication request issuing unit, a processor and a management unit, the method comprising:
receiving, via the receiving unit, a request for an image processing service and authentication information of a service requesting user;
issuing, via the authentication request issuing unit, a request for authenticating the service requesting user to an authentication service in response to the reception of the request for the image processing service;
executing, using the processor, the image processing service requested by the service requesting user based on an authentication result received from the authentication service in response to the authentication request issued in the authentication request issuing step; and
managing, via the management unit, information about an execution status of the image processing service executed by the processor and an authentication state of the service requesting user in an association with each other, and changing the authentication state of the service requesting user corresponding to the image processing service from an authenticated state to an authentication end state in response to the completion of the execution of the image processing service.

10. A non-transitory computer-readable storage medium containing computer-executable instructions for controlling an image processing apparatus that includes a receiving unit, a authentication request issuing unit, a processor and a management unit, the computer-readable medium comprising:
  computer-executable instructions for receiving at the receiving unit a request for an image processing service and authentication information of a service requesting;
  computer-executable instructions for issuing, via the authentication request issuing unit, a request for authenticating the service requesting user to an authentication service in response to the reception of the request for the image processing service;
  computer-executable instructions for executing, using the processor, the image processing service requested by the service requesting user based on an authentication result received from the authentication service in response to the authentication request issued by the authentication request issuing unit; and
  computer-executable instructions for managing, at management unit, information about an execution status of the image processing service executed by the processor and an authentication state of the service requesting user in association with each other, and changing the authentication state of the service requesting user corresponding to the image processing service from an authenticated state to an authentication end state in response to the completion of the execution of the image processing service.

* * * * *